United States Patent [19]

Nakamura et al.

[11] Patent Number: 5,198,309

[45] Date of Patent: Mar. 30, 1993

[54] MAGNETIC RECORDING MEMBER

[75] Inventors: Kyuzo Nakamura; Yoshifumi Ota; Taiki Yamada; Michio Ishikawa; Noriaki Tani, all of Yachimata, Japan

[73] Assignee: Nihon Shinku Gijutsu Kabushiki Kaisha, Chigasaki, Japan

[21] Appl. No.: 89,022

[22] Filed: Aug. 24, 1987

Related U.S. Application Data

[63] Continuation of Ser. No. 798,067, Nov. 14, 1985, abandoned.

[30] Foreign Application Priority Data

Nov. 14, 1984 [JP] Japan .................. 59-238627

[51] Int. Cl.$^5$ .......................... B32B 11/00
[52] U.S. Cl. .................. 428/667; 428/666; 428/668; 428/900; 428/928
[58] Field of Search ............. 428/694, 900, 928, 668, 428/611, 666, 667

[56] References Cited

U.S. PATENT DOCUMENTS

| | | | |
|---|---|---|---|
| 3,150,939 | 9/1964 | Wenner | 428/928 |
| 3,520,664 | 7/1970 | York | 428/928 |
| 4,079,169 | 3/1978 | Nigh et al. | 428/928 |
| 4,245,008 | 1/1981 | Michaelson et al. | 428/611 |
| 4,385,098 | 5/1983 | Sugita et al. | 428/928 |
| 4,511,635 | 4/1985 | Nagao et al. | 428/928 |
| 4,536,443 | 8/1985 | Nagao et al. | 428/900 |
| 4,548,871 | 10/1985 | Kobayashi et al. | 428/611 |
| 4,552,820 | 11/1985 | Lin et al. | 428/667 |
| 4,594,296 | 6/1986 | Noguchi et al. | 428/610 |

FOREIGN PATENT DOCUMENTS 109481  5/1984  European Pat. Off. .
3335165  3/1984  Fed. Rep. of Germany .
2474737  7/1981  France .

OTHER PUBLICATIONS

Ahn et al, IBM Technical Disclosure Bulletin, vol. 21, No. 10, Mar. 1979.
Abstract of Japanese patent 59-142,738, published Aug. 16, 1984.
Maloney, IEEE Transactions on Magnetics, vol. Mag-17, No. 6, Nov. 1981.
Abstract of Japanese patent No. 57-170505, published Oct. 20, 1982.
Lazzari, Jean P., et al. "Thin Evaporated Films with High Coercive Force" vol. Mag-3, No. 3, pp. 205-207, Sep. 1967 IEEE Transactions on Magnetics.
Daval, Jacques, et al, "Electron Microscopy on High-Coercive-Force Co-Cr Composite Films" vol. Mag-6, No. 4, pp. 768-773, Dec. 1970 IEEE Transactions on Magnetics.
Maloney, W. T. "Sputtered Multilayer Films for Digital Magnetic Recording" vol. Mag-15, No. 3, pp. 1135-1137, Jul. 1979, IEEE Transactions on Magnetics.
Maloney, W. T. "RF-Sputtered Chromium-Cobalt Films for High-Density Longitudinal Magnetic Recording" vol. Mag-15, No. 6, pp. 1546-1548, Nov. 1979 IEEE Transactions on Magnetics.

*Primary Examiner*—John P. Sheehan
*Attorney, Agent, or Firm*—Armstrong, Westerman, Hattori, McLeland & Naughton

[57] ABSTRACT

An improved magnetic recording member comprising a magnetic metallic film having the composition $Co_xCr_yNi_z$ wherein x, y, and z are atomic ratios and $0.45 \leq x < 1.0$; $0 < y \leq 0.25$; and $x+y+z=1$. The magnetic metallic film is formed over a Cr film provided on a surface of a non-magnetic substrate.

2 Claims, 2 Drawing Sheets

MAGNETIC RECORDING MEMBER

This application is a continuation of application Ser. No. 798,067, filed Nov. 14, 1985, now abandoned.

This invention relates to a magnetic recording member suitable for a longitudinal type recording hard disk medium or similar medium.

Hitherto, a metallic thin film type magnetic recording member has been noted as being suitable for high density recording, and its application to practical use has begun. Among various types of such a magnetic recording member is one formed by a process wherein, after a non-magnetic substrate is provided on one of its surfaces with a Cr film, a Co film is formed on the surface of the Cr film by a sputtering process or a vapor deposition process. This type of magnetic recording member has a high magnetic coercive force in its longitudinal direction, and has been used in a longitudinal type recording hard disk medium and similar medium. A recent practice has been to replace the Co film constituting the magnetic film of the foregoing recording member with a Co-Ni film.

The above-described magnetic recording member wherein a Co magnetic film is formed on a Cr film provided on a surface of a non-magnetic substrate has an increased coercive force if the thickness of the Cr film is increased. For obtaining a recording member with a coercive force of about 600–800 Oe, the thickness of the Cr film must be 4000–8000 Å. If mass-production of the recording member by a sputtering process or a vapor deposition process is intended, the fact that the thickness of the Cr film must be as great as 4000–8000 Å causes problems such as large consumption of Cr by the target and relatively small productivity. Accordingly, it is desirable to obtain a product having a coercive force of about 600–800 Oe, but characterized by a small thickness of the Cr film. Otherwise stated, it is desirable to produce a magnetic recording member having a coercive force which is higher than 600–800 Oe and a Cr film thickness of 4000–8000 Å.

A magnetic recording member comprising a Co film as a magnetic film is defective in that it has a low anti-corrosion property. If this Co magnetic film is replaced with a Co-Ni magnetic film, a magnetic recording member is obtained which has not only an improved coercive force, but also an improved anticorrosive property. For example, a magnetic recording member having a coercive force of 700 Oe and a Cr film thickness of 3000 Å can be obtained. However, it remains desirable to obtain the same coercive force with an even more reduced thickness of the Cr film and an even higher anticorrosive property.

SUMMARY OF THE INVENTION

An object of this invention is to provide a magnetic recording member meeting the above-described goals. In the magnetic recording member of this invention, a magnetic metallic film is formed over a Cr film provided on a surface of a non-magnetic substrate, the composition of the magnetic metallic film being represented by $Co_xCr_yNi_z$ wherein x, y, and z are atomic ratios and satisfy the following equations:

$$0.45 \leq x < 1.0,$$

$$0 < y \leq 0.25, \text{ and}$$

$$x + y + z = 1$$

DESCRIPTION OF INVENTION

The magnetic recording member of this invention is described below in reference to embodying examples and comparative examples.

Magnetic films according to this invention composed of Co-Cr or Co-Cr-Ni in various composition ratios obtained by varying the amount m of Cr added to Co or Co-Ni were formed on respective Cr films which had been previously formed on a surface of non-magnetic substrates. The magnetic recording members thus obtained were tested for their coercive force and anticorrosive property.

Figure 1:
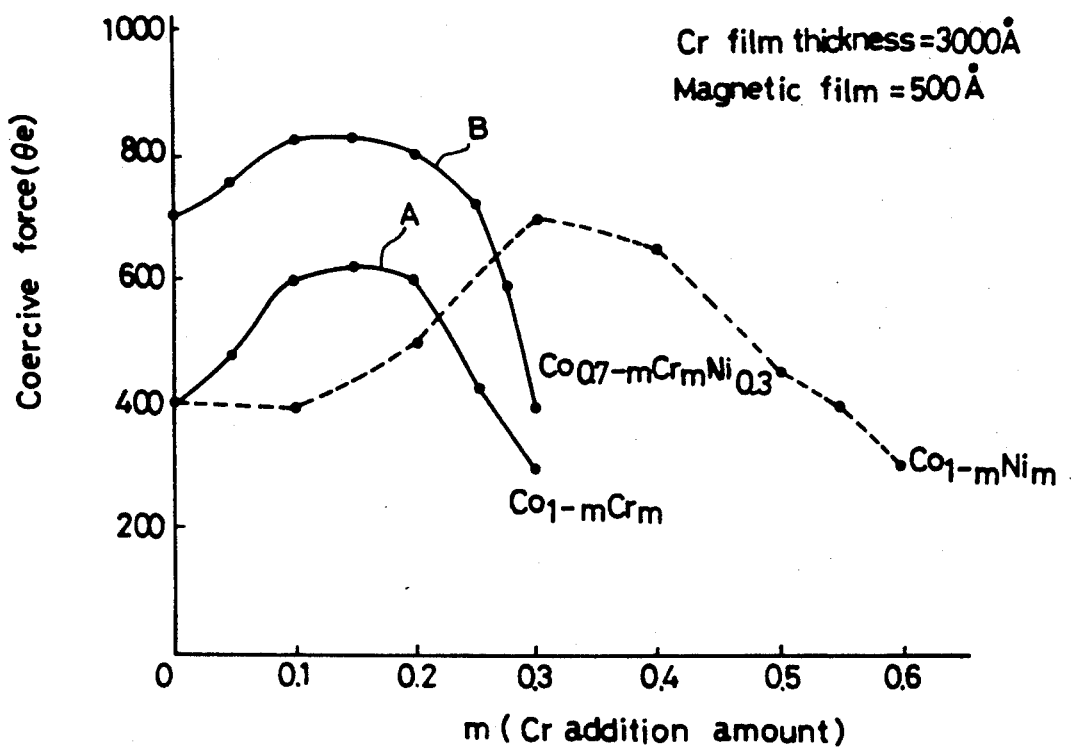
FIG. 1 is a diagram showing the relationship between the coercive force and the composition for an embodying example of the magnetic recording member of this invention and for comparative examples.
Figure 2:
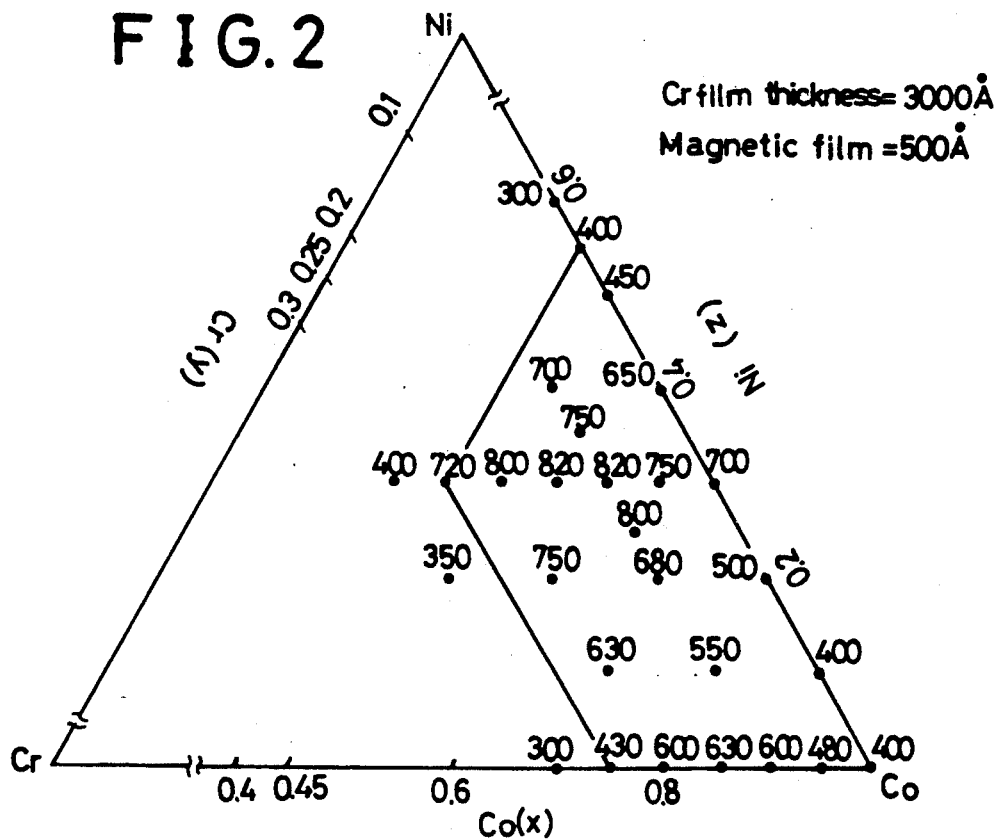
FIG. 2 is a triangular diagram showing the coercive force for magnetic recording members comprising magnetic films of varying Co-Cr-Ni compositions.

FIGS. 1 and 2 show the relationship between the coercive force of the foregoing magnetic recording members and the composition ratio of the magnetic film composed of binary or ternary alloys. In each recording member, the thickness of the Cr film is 3000 Å and the thickness of the magnetic film of Co-Cr or Co-Cr-Ni is 500 Å.

As shown by curve A for the Co-Cr magnetic film and curve B for the Co-Cr-Ni magnetic film in FIG. 1, the coercive force of magnetic films made of binary or ternary alloys is increased in comparison with that of a magnetic film containing only Co, until the amount m of Cr added reaches about 25 at .%. In particular, a maximum coercive force of 800 Oe can be obtained with a Co-Cr-Ni magnetic film wherein the amount m of Cr added is about 15 at %. This maximum coercive force obtained with a ternary alloy according to this invention is higher than the maximum coercive force of 700 Oe obtained with a conventional binary alloy of Co-Ni having the following composition: $Co_{0.7}Ni_{0.3}$.

A magnetic film composed of Co only has a coercive force of only 400 Oe. As shown in FIG. 2, the magnetic film of this invention composed of Co-Cr or Co-Cr-Ni has a coercive force higher than 400 Oe in the range where $0.45 \leq x < 1.0$; $0 < y \leq 0.25$; and $x + y + z = 1$. The optimum composition ratio is approximately $Co_{0.60}Cr_{0.10}Ni_{0.30}$.

Figure 3:
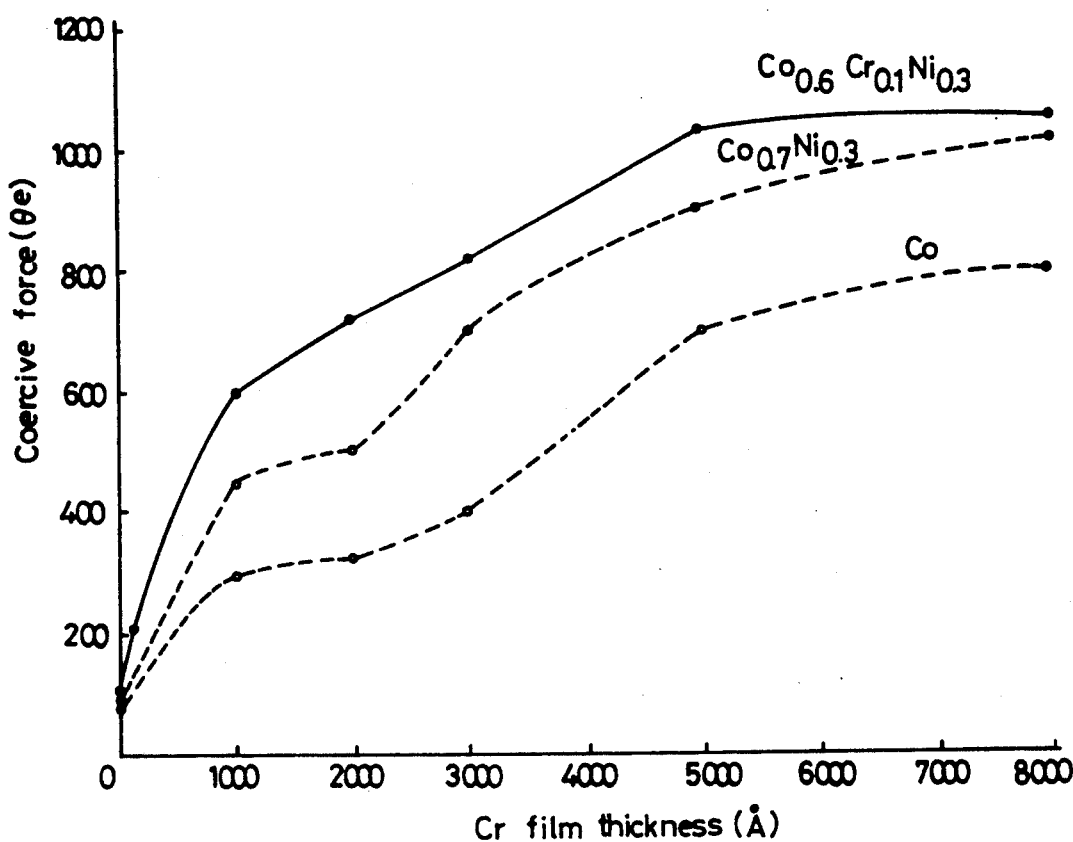
FIG. 3 is a diagram showing the relationship between the Cr film thickness and the coercive force for an embodiment of the magnetic recording member of this invention and comparative examples.

FIG. 3 shows the relationship between the thickness of an underlying Cr film formed on the non-magnetic substrate and the coercive force of a magnetic recording member comprising the following three magnetic films, respectively:

$Co_{0.60}Cr_{0.10}Ni_{0.30}$ according to this invention;
$Co_{0.7}Ni_{0.3}$ according to the prior art; and
Co only according to the prior art.

In order to obtain the same coercive force of 700 Oe, a Cr film thickness of 5000 Å is required in the case of the Co magnetic film, and a Cr film thickness of 3000 Å is required in the case of the Co-Ni magnetic film. In contrast, a Cr film thickness of only 2000 Å is required in the case of the magnetic film of Co-Cr-Ni according to this invention. Additionally, the magnetic recording member comprising a magnetic film according to this invention always has an improved coercive force regardless of the thickness of the Cr film, as compared to magnetic recording members comprising magnetic films composed of Co-Ni or Co only.

Figure 4:
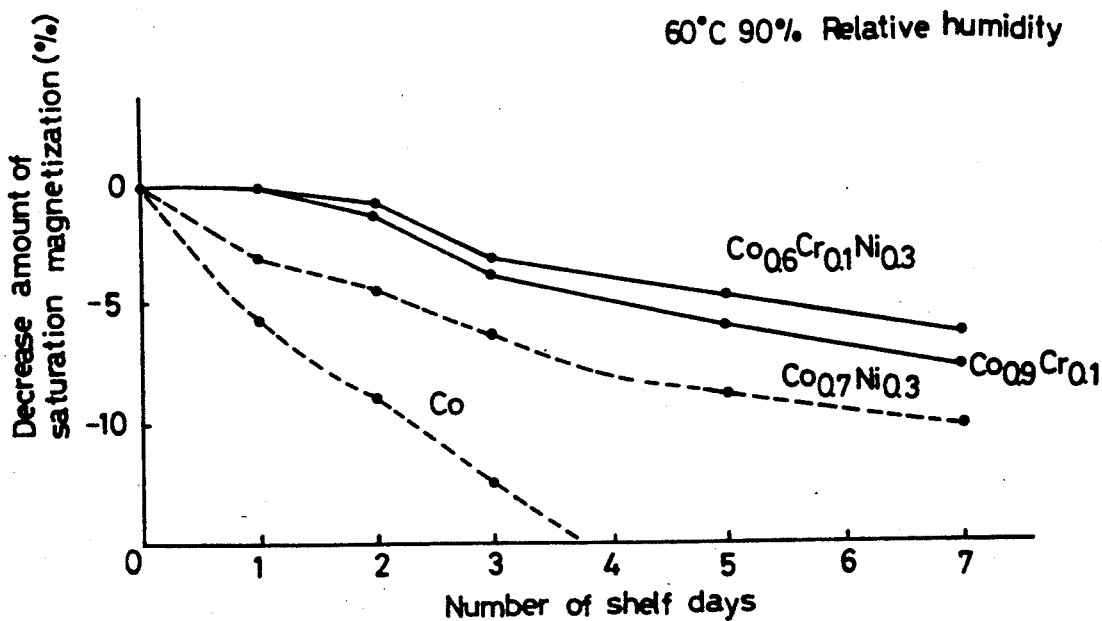
FIG. 4 is a diagram showing the anti-corrosion property of embodiments of the magnetic recording member of this invention and comparative examples.

Magnetic films according to this invention composed of Co-Cr or Co-Cr-Ni were tested, together with conventional magnetic films composed of Co only or Co-Ni, for their anti-corrosion properties. The test of anti-corrosion property was carried out under conditions of constant temperature of 60° C. and constant moisture of 90%. The decrease in saturation magnetization was taken as a measure of the anti-corrosion property. The results shown in FIG. 4 clearly indicate that the magnetic film of this invention has an extremely improved anti-corrosion property.

In the production of the magnetic recording member of this invention, a minor amount of another element may be added to the magnetic film. Additionally, any desired protective film composed of organic or inorganic material characterized by abrasion resistance or anti-corrosion property can be applied on the upper surface of the magnetic film thus produced.

The Cr film may be formed on the non-magnetic substrate by sputtering, vapor deposition, or other similar process. The magnetic film of this invention composed of Co-Cr or Co-Cr-Ni formed on the surface of the foregoing Cr film may be also be formed by sputtering, vapor deposition, or other similar process. However, because Cr, Co and Ni have different vapor pressures, a sputtering process is preferable because it facilitates production of the magnetic film. It is preferable that the time elapsed between the formation of the magnetic film and the formation of the Cr film be as short as possible.

The following is an example of the production conditions for producing a magnetic recording member of this invention by a DC magnetron sputtering process. The substrate is a slide glass plate. The substrate temperature is room temperature. The vacuum maintained is $8 \times 10^{-7}$ Torr or less. The Ar pressure during sputtering is $1 \times 10^{-2}$ Torr. The magnetic film thickness is 500 Å. The Cr film deposition rate is 1000 Å/min. The magnetic film deposition rate is 500 Å/min. The distance between the target and the substrate is 100 mm, and variations in the composition of Co, Cr, Ni of the magnetic film are obtained by carrying out the sputtering with a chip of Cr or Ni placed on a Co target. The analysis of the composition of the produced magnetic film is carried out by fluorescent X-ray.

Magnetic recording members according to this invention have a remarkably greater coercive force than conventional magnetic recording members. Furthermore, in producing a magnetic recording member having a given coercive force, a Cr film of a significantly small thickness can be used in the magnetic recording member according to this invention. Thus, consumption of the target can be greatly reduced and productivity improved. A further advantage of the magnetic recording member of this invention is that it has a remarkably improved anti-corrosion property, as compared with conventional magnetic recording members.

What is claimed is:

1. In a magnetic recording member comprising a magnetic metallic film formed on a Cr film provided on a surface of a non-magnetic substrate, the improvement wherein said magnetic metallic film consists essentially of Co, Cr and Ni in the proportions represented by $Co_xCr_yNi_z$ wherein x, y and z are atomic ratios and $0.45 \leq x < 0.85$; $0.05 \leq y \leq 0.25$; $0.1 < z \leq 0.5$; and $x+y+z=1$.

2. A magnetic recording member according to claim 1, wherein the composition of the magnetic metallic film is approximately $Co_{0.60}Cr_{0.10}Ni_{0.30}$.

* * * * *